Jan. 25, 1949.     G. T. ROYDEN     2,459,842
CRYSTAL CONTROLLED OSCILLATOR
Filed Aug. 19, 1944

INVENTOR
*George T. Royden*
BY
*Robert Harding Jr.*
ATTORNEY

Patented Jan. 25, 1949

2,459,842

UNITED STATES PATENT OFFICE 2,459,842

CRYSTAL CONTROLLED OSCILLATOR

George T. Royden, South Orange, N. J., assignor to Federal Telephone and Radio Corporation, New York, N. Y., a corporation of Delaware Application August 19, 1944, Serial No. 550,245

9 Claims. (Cl. 250—36)

This invention relates to regenerative oscillation, and more particularly to the production of electrical oscillations for power or signal purposes wherein the oscillations are controlled by a piezoelectric crystal.

An object of this invention is to provide a reliable and inexpensive source of power or signal oscillations which is stable under variations in operating conditions, such as, variations in the temperature of the circuit elements and variations in load conditions. A further object is to provide a highly efficient method and apparatus for producing accurately controlled oscillations by the use of a crystal. A still further object is to provide an oscillating system wherein a regenerative or positive feed-back effect is utilized to sustain oscillations at the preferred frequency, and wherein a degenerative or negative feed-back effect is utilized to insure that the oscillations are at the preferred frequency. A further object is to provide a system of the type referred to above which is directly controlled by a piezoelectric crystal and which will deliver maximum power. These and other objects will be in part obvious and in part pointed out below.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings in which are represented three of the many possible embodiments of the invention:

In the illustrative embodiments of the invention conventional representations are used and the known relative characteristics of parts are intended except where otherwise designated. Details have been omitted where it is clearly understood that one skilled in the art would know the proper units to be used.

Figure 1:
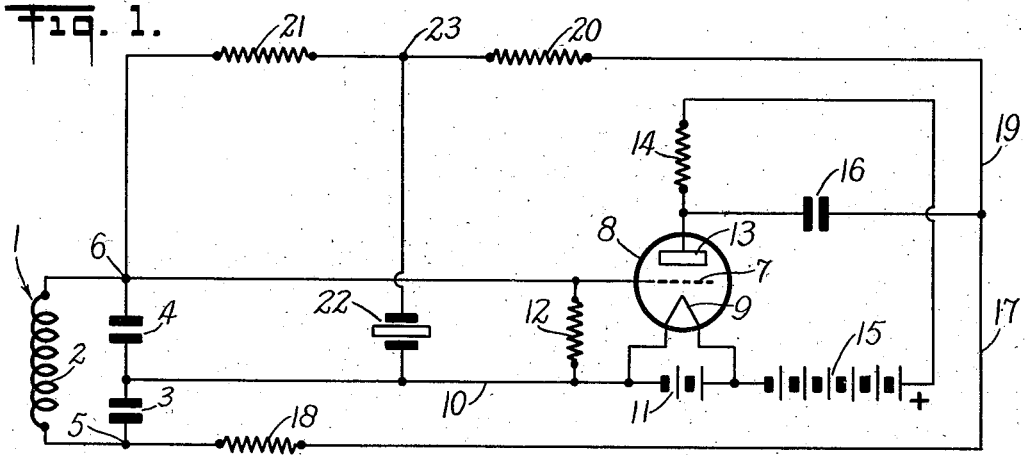
Figure 1 represents one embodiment of the invention.

Referring particularly to Figure 1 of the drawings, a resonance unit 1 is formed by an inductance 2 and a pair of capacitors 3 and 4, and has terminals 5 and 6. Terminal 6 is connected to the grid 7 of an oscillator tube 8, the cathode 9 of which is connected through a lead 10 to the juncture of capacitors 3 and 4. Cathode 9 is heated by a battery 11 and the proper grid bias is maintained by a grid leak resistor 12. Tube 8 has a plate or anode 13 which is connected through a resistor 14 to the positive side of battery 15 the other side of which is connected to cathode 9.

A regenerative or positive feedback circuit from anode 13 is formed by a blocking-condenser 16, a lead 17, and a resistor 18 to terminal 5 of the resonance circuit 1. A degenerative circuit is formed from anode 13, by blocking-condenser 16, a lead 19, and a pair of resistors 20 and 21, to the grid terminal 6 of the resonance circuit 1. A quartz crystal 22 having the same oscillating frequency as resonance circuit 1 is connected from the juncture 23 of resistors 20 and 21 to lead 10 and thence to cathode 9 of tube 8; this forms a frequency-selective bypass circuit from the degenerative or negative feed-back circuit to the cathode 9.

Regenerative oscillation in the circuit is promoted by the positive feed-back through the regenerative circuit. For example, during an oscillation a potential rise at grid terminal 6 of the resonance circuit is impressed on grid 7 so that there is an increase in the flow of current through tube 8 and resistor 14. This rising current through resistor 14 causes the potential of anode 13 to change in a negative direction and this change is carried through the regenerative circuit to terminal 5 of the resonance circuit 1, the potential of which is changing in an opposite direction from the change at terminal 6; that is, in a negative direction which is the same as the regenerative feed-back. Accordingly, the regenerative feed-back promotes oscillation, and oscillations are sustained in resonance circuit 1.

However, the negative change in potential of anode 13 is also carried by the degenerative circuit to the grid terminal 6 of the resonance circuit 1, and this negative feed-back is opposite in phase to the phase of the potential at terminal 6. Thus, a degenerative effect is produced which may be sufficient to prevent sustained oscillation. However, as pointed out above, the juncture 23 of resistors 20 and 21 is connected through the frequency-selective bypass circuit formed by crystal 22 to cathode 9. Crystal 22 acts as a high-Q, series resonance circuit and at the resonance frequency the major portion of the negative feed-back energy is bypassed to cathode 9 so that it does not reach terminal 6. By a suitable choice of circuit constants oscillations are sustained at the resonance frequency of the crystal, and if there is a tendency for the frequency to drift or change the crystal exerts a compensating effect to maintain the oscillations at the desired frequency. For example, if during the operation there is a change in the resonance circuit 1 which will give the effect of a decrease in the capacitance of capacitor 4, the degenerative feed-back energy supplied to crystal 22 is at a slightly higher frequency than the resonance frequency of the crystal; thus, the crystal will produce an inductive effect which will react through resistor 21 across capacitor 4 and compensate for the effect of the apparent change in capacitance. A similar but reverse effect follows if there is a tendency for the frequency to drift in the opposite direction. Thus, the crystal effectively controls the operation and maintains the oscillations at the proper frequency.

Figure 2:
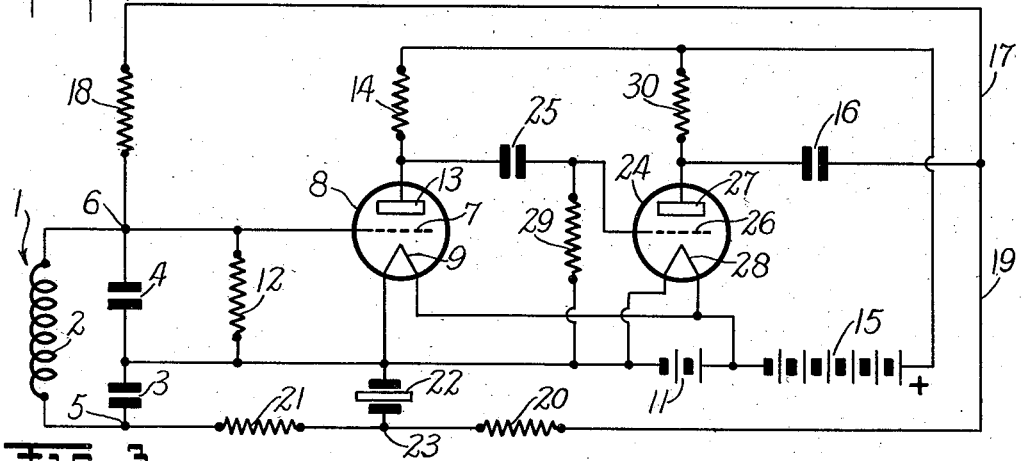
Figure 2 represents a system where an amplified control effect is exerted.

In the embodiment of Figure 2, an amplifying tube 24 is connected to oscillating tube 8 and the regenerative and degenerative feed-back circuits are connected to this amplifying tube. Accordingly, an interstage, blocking-condenser 25 connects anode 13 of tube 8 to the grid 26 of tube 24, and tube 24 has a plate or anode 27, a cathode 28 heated by battery 11, and a grid resistor 29. The cathode-anode circuit is connected through a resistor 30 to battery 15. The regenerative circuit is connected between anode 27 and grid terminal 6 of resonance circuit 1, and is formed by blocking-condenser 16, lead 17 and resistor 18. The degenerative circuit connects anode 27 to terminal 5 of resonance circuit 1, and is formed by blocking-condenser 16, lead 19 and resistors 20 and 21. The frequency-selective bypass circuit formed by crystal 22 connects the juncture 23 of resistors 20 and 21 to cathode 9 of oscillator tube 8.

The regenerative and degenerative effects are the same in this embodiment as in the embodiment of Figure 1 except that the phase of the feed-back energy is reversed by amplifier tube 24 and for this reason the two feed-back circuits are connected to the terminals of the resonance circuit respectively opposite those to which they are connected in the embodiment of Figure 1. Accordingly (as in the discussion of Figure 1), assuming that the potential at terminal 6 is rising so that the current in tube 8 is increasing and a negative change of potential is taking place on anode 13, this negative change is effective through blocking-condenser 25 on grid 26 of tube 24. This negative change in grid potential causes a reduced flow of current through tube 24 and resistor 30 with the result that there is a change in a positive direction in the potential of anode 27. This positive change results in a regenerative or positive feed-back through the regenerative circuit to terminal 6 and simultaneously causes a degenerative or negative feed-back through the degenerative circuit to terminal 5. The bypass circuit formed by crystal 22 acts in the same manner as in the embodiment of Figure 1 to exert a strict control effect upon the frequency.

Figure 3:
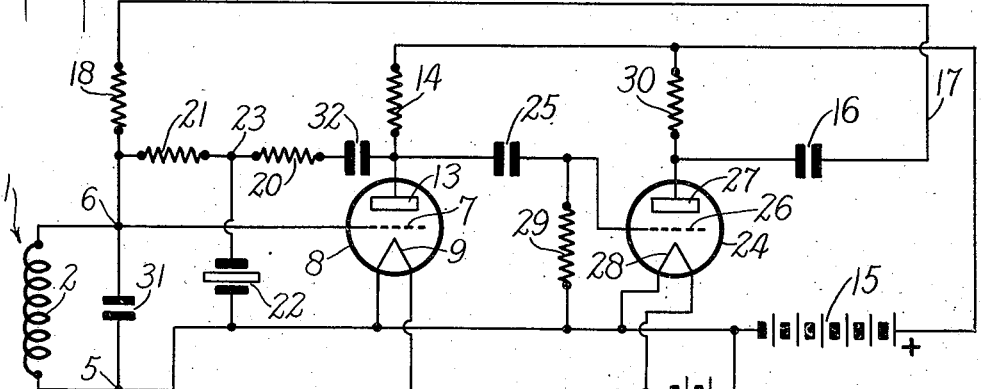
Figure 3 is a system wherein the regenerative and degenerative effects are exerted at a single point in the circuit.

In the embodiment of Figure 3 the resonance circuit 1 is formed by the inductance 2 and capacitor 31, and has its grid terminal 6 connected to grid 7 of the oscillator tube 8 and its terminal 5 connected to cathode 9. In this embodiment, as in Figure 2, an amplifier tube 24 is provided, and the regenerative or positive feed-back is obtained from its plate 27. As explained in connection with the embodiment of Fig. 2, a rising potential at terminal 6 produces a positive going potential at anode 27 which when coupled back to terminal 6 by means of condenser 16 and resistor 18 produces regeneration. However, the degenerative effect is obtained by connecting the degenerative circuit from plate 13 of the oscillator tube 8 to the grid terminal 6 of the resonance circuit 1. This degenerative circuit is formed by a blocking-condenser 32 and resistors 20 and 21. The frequency-selective bypass circuit formed by crystal 22 connects the juncture 23 with cathode 9. It will be seen that the degenerative effect is obtained as in the embodiment of Figure 1 and the regenerative and degenerative feed-back effects are combined at terminal 6.

When desirable, tetrodes, pentodes, or other multi-element vacuum tubes may be substituted for one or more of the triodes shown. With the systems herein disclosed a much higher power oscillator tube, and consequently a much larger oscillator power output, is permissible than with conventional crystal-controlled oscillators. In general, the stability of the system depends upon the amplification of the feed-back signals. The value of resistor 18 is large in comparison with the impedance of the resonance circuit 1 as this gives dependable control. The values of resistors 20 and 21 are large in comparison with the resistance component of the crystal at the series resonance frequency. Either or both of resistors 20 and 21 may be of the type which decreases its resistance with an increase of current for the purpose of regulating the amplitude of oscillations. Resistor 18 may be of the type which increases its resistance with an increase of current to accomplish the same purpose.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

What I claim is:

1. An oscillator including, the combination of, a resonance circuit having a predetermined resonance frequency, an oscillator tube connected to said resonance circuit to produce oscillations, amplifying means connected to said oscillator tube to act as a source of amplified feed-back energy, means forming a regenerative circuit connecting said amplifying means to said resonance circuit and to supply the feed-back energy in a regenerative sense, and means forming a degenerative circuit connecting said amplifying means to said resonance circuit to supply the feed-back energy in a degenerative sense so as to tend to prevent oscillation in said resonance circuit, said degenerative circuit comprising a piezo-electric crystal series resonant at said predetermined frequency and effective at said predetermined frequency to render the degenerative action ineffective.

2. In an oscillator generator for producing oscillations of a predetermined frequency, the combination of, an oscillating circuit comprising a resonance circuit and an oscillator tube, amplifying means connected to an anode of said oscillator tube to act as a supply for feed-back energy, means connecting said amplifying means to said resonance circuit to supply said feed-back energy in a regenerative sense thereby to promote oscillations at said predetermined frequency, and means connecting said amplifying means to said resonance circuit thereby to tend to prevent oscillations, said last-mentioned means comprising a quartz crystal having a series resonance frequency substantially the same as said predetermined frequency and connected to bypass the feed-back energy being supplied in a negative sense whereby the feed-back energy being supplied in a negative sense is rendered ineffective at said predetermined frequency.

3. An oscillator including, a resonance circuit having a predetermined resonance frequency, an oscillator tube having a cathode, a control element and an anode means for connecting one end of said circuit to said control element, means for connecting said cathode to a point intermediate the ends of said circuit, a regenerative circuit comprising a blocking condenser and a resistor connecting said anode to the other end of said resonance circuit to supply feed-back energy in a regenerative sense to said resonance circuit, a degenerative circuit comprising said blocking condenser and a pair of resistors in series connected between said anode and the control element end of said resonance circuit to supply degenerative feed-back energy to said resonance circuit, and a bypass crystal circuit which is responsive to said predetermined frequency and which is connected from the juncture of said resistors to said cathode whereby the degenerative effect is neutralized at said predetermined frequency.

4. An oscillator including, the combination of, a resonance circuit having a predetermined resonance frequency, an oscillator tube having a cathode, a control element and an anode means for connecting one end of said circuit to said control element, means for connecting said cathode to the other end of said circuit, an amplifier tube having a grid connected to said anode and having an anode and a cathode, a regenerative circuit comprising a blocking capacitor and a resistor connecting the anode of said amplifier tube to said control element to supply feed-back energy in a regenerative sense to said resonance circuit, and a degenerative circuit comprising a blocking condenser and a pair of resistors in series connecting the anode of said oscillating tube to said control element to supply feed-back energy in a degenerative sense to said resonance circuit, and a degenerative control circuit formed by a piezo-electric crystal having a series resonance frequency substantially the same as said predetermined frequency and connecting the juncture of said resistors and the cathode of said oscillator tube whereby the degenerative effect is neutralized at said predetermined frequency.

5. An oscillator including a resonance circuit having a predetermined resonance frequency, an oscillator tube having a cathode, a control element and an anode means for connecting one end of said circuit to said control element, means for connecting said cathode to a point intermediate the ends of said circuit, a regenerative circuit comprising a blocking condenser and a resistor connecting said anode to the other end of said resonance circuit to supply feed-back energy in a regenerative sense to said resonance circuit, a degenerative circuit comprising said blocking condenser and a pair of resistors in series connected between said anode and the control element end of said resonance circuit to supply degenerative feed-back energy to said resonance circuit, and a by-pass crystal circuit which is responsive to said predetermined frequency which is connected from the juncture of said last mentioned resistors to said cathode whereby the degenerative effect is neutralized at said predetermined frequency, the resistor in said regenerative circuit being of the type that increases its resistance with an increase of current for regulating the amplitude of oscillations.

6. An oscillator in accordance with claim 5, in which at least one resistor in the degenerative circuit is of the type which decreases its resistance with an increase of current.

7. In an oscillator for producing oscillations of a predetermined frequency, an amplifier having input and output circuits, means for regeneratively coupling energy from said output circuit to said input circuit and means for degeneratively coupling energy from said output circuit to said input circuit comprising a crystal having a series resonance frequency substantially the same as said predetermined frequency and connected to bypass said degenerative coupling means at said frequency whereby the degenerative effect is minimized at said predetermined frequency.

8. An oscillator in accordance with claim 3 wherein the resistance of at least one of said resistors varies with the current flowing therethrough.

9. An oscillator comprising an oscillator tube having a cathode, a control element and an anode, a resonant circuit having a predetermined frequency connected at one end to said control element and at a point intermediate the ends thereof to said cathode, an amplifier tube having a cathode, a control element and an anode, means for coupling the control element of said amplifier tube to the anode of said oscillator tube, a regenerative circuit comprising a capacitor and a resistor connecting the anode of said amplifier tube to the control element of said oscillator tube, and a degenerative circuit comprising a capacitor and a pair of resistors in series connected to the other end of said resonant circuit and a piezo-electric crystal having a resonant frequency substantially equal to said predetermined frequency connected between the juncture of said last-mentioned resistors and the cathode of said oscillator whereby the degenerative effect is minimized at said predetermined frequency.

GEORGE T. ROYDEN.

REFERENCES CITED

The following references are of record in the file of this patent:

UNITED STATES PATENTS

| Number | Name | Date |
|---|---|---|
| 1,830,642 | Crossley | Nov. 3, 1931 |
| 2,115,858 | Keall | May 3, 1938 |
| 2,135,730 | Peterson | Nov. 8, 1938 |
| 2,173,427 | Scott | Sept. 19, 1939 |
| 2,189,770 | Samuel | Feb. 13, 1940 |
| 2,286,436 | Odell | June 16, 1942 |
| 2,298,774 | Parker | Oct. 13, 1942 |
| 2,341,067 | Wise | Feb. 8, 1944 |
| 2,394,018 | Shank et al. | Feb. 5, 1946 |